United States Patent [19]

Woodley

[11] 4,128,198
[45] Dec. 5, 1978

[54] ENDLESS TAPE LOOP STORAGE APPARATUS

[76] Inventor: George M. Woodley, 14200 NE. 21st., Bellevue, Wash. 98007

[21] Appl. No.: 813,092

[22] Filed: Jul. 5, 1977

Related U.S. Application Data

[63] Continuation of Ser. No. 654,199, Feb. 2, 1976, abandoned.

[51] Int. Cl.² .................... B65H 17/32; B65H 75/00
[52] U.S. Cl. .................................... 226/97; 226/118; 242/182
[58] Field of Search .............. 226/97, 119, 118, 7; 242/182, 183, 184, 185

[56] References Cited

U.S. PATENT DOCUMENTS

| | | | |
|---|---|---|---|
| 2,679,394 | 5/1954 | Lear | 226/118 |
| 2,979,244 | 4/1961 | Pouliart et al. | 226/118 |
| 3,123,269 | 3/1964 | Morley et al. | 226/118 |
| 3,185,400 | 5/1965 | Maxey | 226/118 X |
| 3,465,936 | 9/1969 | Wright | 226/118 X |
| 3,472,436 | 10/1969 | Jura | 226/97 X |
| 3,499,589 | 3/1970 | Johnson et al. | 226/97 |
| 3,514,024 | 5/1970 | Hawkins | 226/97 |
| 3,528,593 | 9/1970 | Armstrong et al. | 226/97 |
| 3,633,807 | 1/1972 | Williams | 226/97 |
| 3,712,526 | 1/1973 | Hanousek et al. | 226/97 |
| 3,999,696 | 12/1976 | Reba et al. | 226/97 X |

Primary Examiner—Bruce H. Stoner, Jr.
Attorney, Agent, or Firm—Graybeal, Barnard & Uhlir

[57] ABSTRACT

An endless loop tape storage apparatus comprising a horizontally disposed storage receptacle in which the bulk of the tape loop forms into serpentine folds. The tape is moved into the receptacle by opposed relatively high velocity, low volume air jets adjacent an entrance slot and the accumulation of tape folds in maintained fluid in the main storage region of the receptacle by opposed, rearwardly directed relatively low velocity high volume air jets acting in concert with opposed relatively low velocity high volume air jets directed on the tape in a rearward discharge region adjacent an exit slot, a portion of the latter jets being directed forwardly to keep the collapsing folds of tape forward of the discharge throat region. Air exhaust apertures are provided in at least one of the top and bottom plates of the receptacle in the main storage region thereof so that air freely exhausts therefrom. The withdrawn tape is driven by return thereof to a conventional capstan drive tape deck or the like and the capstan drive is the sole mechanical driving force applied to the tape loop.

15 Claims, 7 Drawing Figures

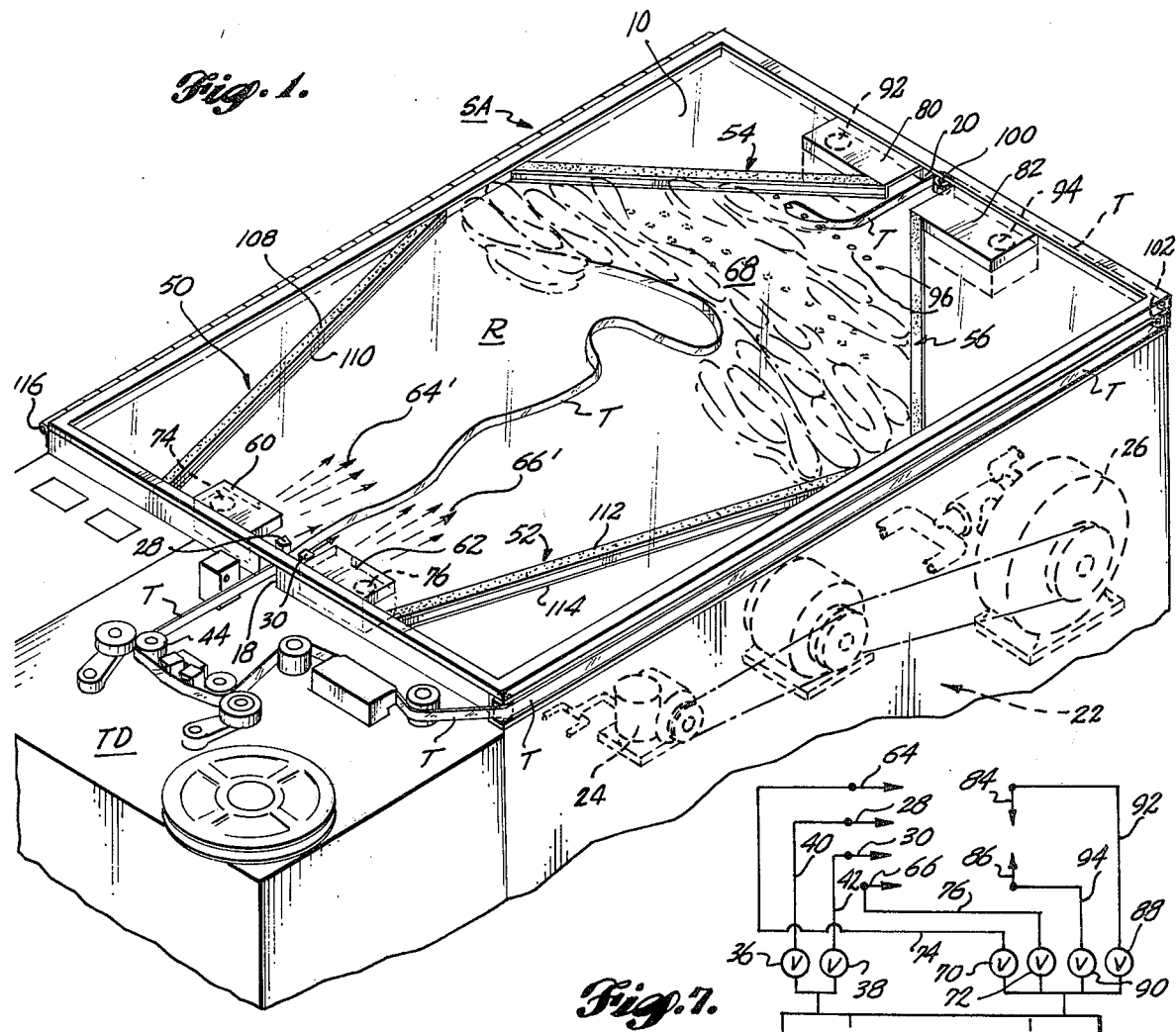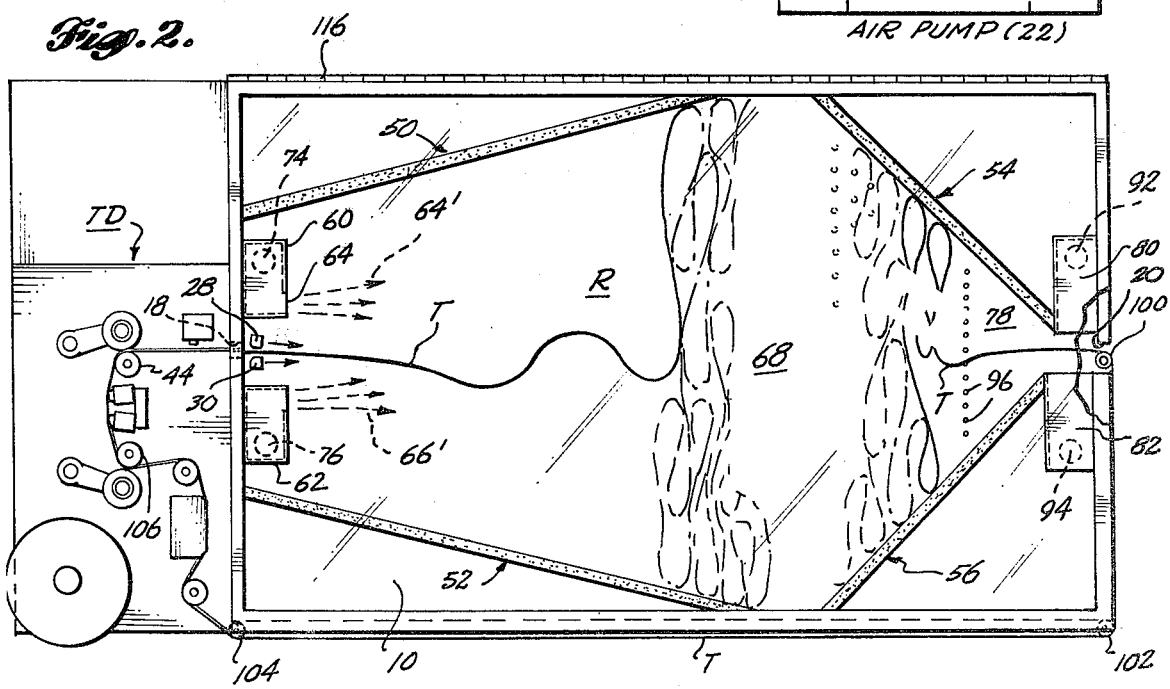

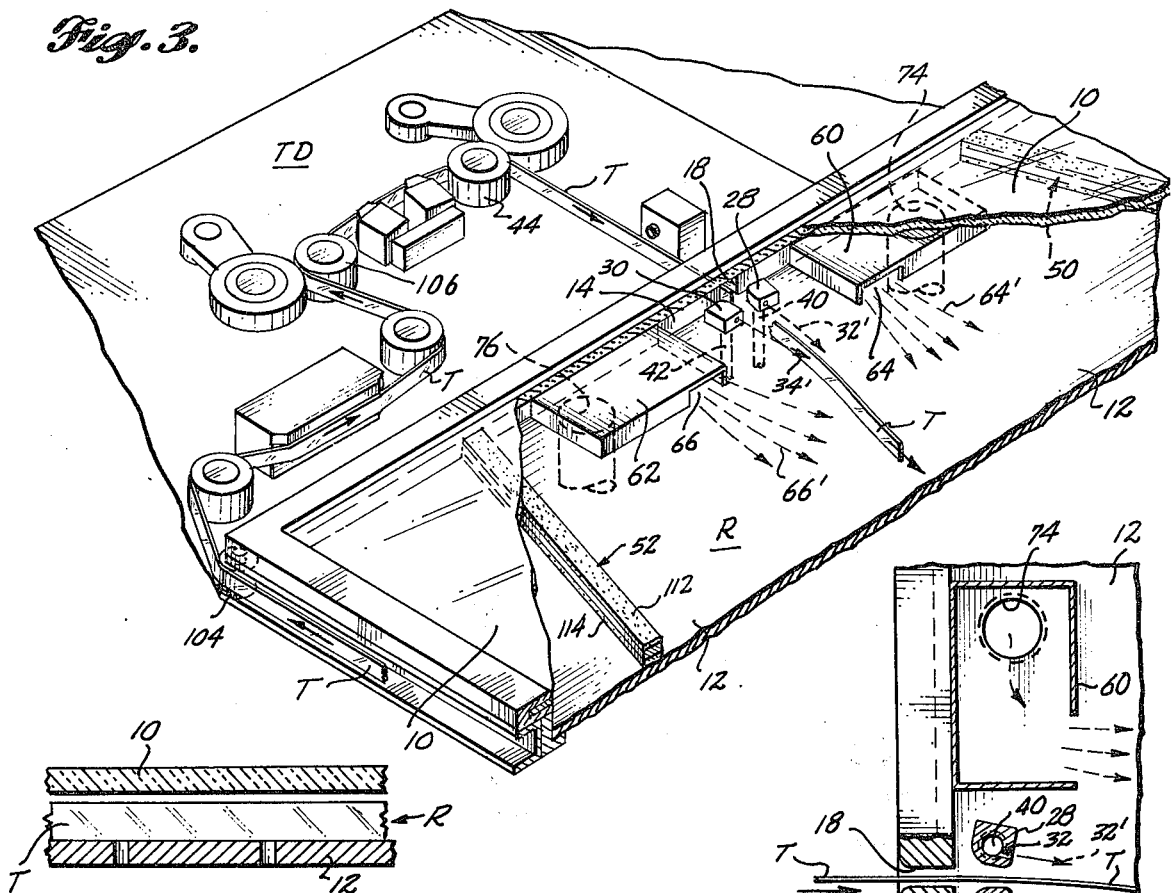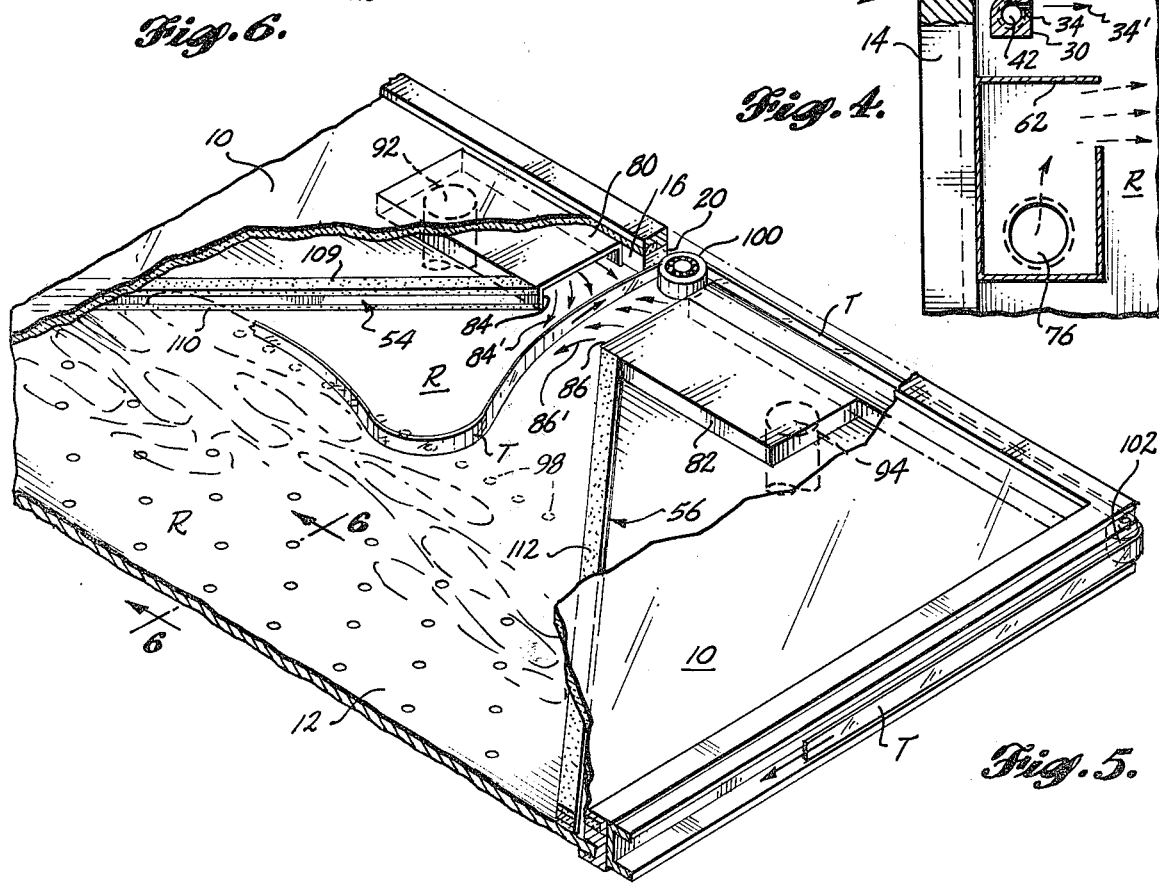

ENDLESS TAPE LOOP STORAGE APPARATUS

CROSS-REFERENCE TO RELATED APPLICATION

This application is a continuation of my copending application Ser. No. 654,199, filed Feb. 2, 1976, now abandoned, and entitled Endless Tape Loop Storage Apparatus.

BACKGROUND OF THE INVENTION

1. Field of the Invention

Endless loop tape storage apparatus as used in conjunction with magnetic tape recorder/reproducer tape decks and the like, and wherein only a small portion of the tape is in use at the transducer head of the tape deck at any given time and the rest of the endless tape loop is stored on edge in a condition ready to be withdrawn and returned to the tape deck at high lineal speed.

2. Description of the Prior Art

A known endless tape loop storage system is disclosed in Johnson et al. U.S. Pat. No. 3,499,589, wherein the tape loop enters and leaves a horizontal receptacle through entrance and exit slots, and forms into serpentine folds in the receptable. In the Johnson et al. tape storage device, generally horizontal air delivery slots are situated adjacent the tape entrance and exit slots to form tiny wavy loops or "burbles" in the tape, and delivery of the tape to the receptacle is by a capstan drive means situated directly in the entrance slot. The Johnson et al. system adequately handles relatively wide tape (e.g. 1 inch wide magnetic tape) but has proven deficient in handling relatively narrow tape (e.g. ¼ inch magnetic tape), particularly at relatively high lineal tape drive speeds. Also, when used in conjunction with a conventional capstan drive type tape deck, the Johnson et al. loop storage mechanism requires additional, relatively costly tape tension sensing components between the tape deck capstan drive and the storage apparatus capstan drive to regulate the drive speed of the entrance drive capstan responsive to the tension of the tape portion being fed to it by the tape deck drive. In addition, although the Johnson et al. system provided some degree of air flow at the entrance and exit slots of the storage receptacle, the amount of air delivered at the entrance slot is insufficient to feed the tape into the receptacle without use of a capstan drive directly at the entrance slot, and the amount of air introduced at the exit slot is not sufficient to maintain the adjacent folds of tape well clear of the exit slot, or induce slight tension in the portion of the tape loop immediately ahead of the exit slot so that it has a substantially straight trajectory and will not bunch or become entangled as it is withdrawn from the exit slot. The Johnson et al. equipment also does not provide any air flow directed rearwardly on the main body of the folded tape and thus does not maintain the bulk of the folded tape well clear of the entrance slot and in a dynamic state of motion sufficient to minimize pile up of the folded tape.

Also known is a data tape drive and storage unit, as disclosed in Jura U.S. Pat. No. 3,472,436, wherein tape is driven by pneumatic discharge through a tape surrounding nozzle delivering air jets directly against the sides of the tape. However, the Jura unit involved vertical folds of the tape loop coursing a generally U-shaped or like reservoir with gravity transfer of the folds through the reservoir. Known as well is a weft thread feeding mechanism as disclosed in Hanouscek et al. U.S. Pat. No. 3,712,526 wherein a weft thread is fed intermittently by means including an enclosed air jet directed convergingly toward the thread.

Various other endless tape loop storage receptacles are also known which involve vertically arranged loop storage, such as the equipments disclosed in Pouliart et al. U.S. Pat. No. 2,962,200, Morely et al. U.S. Pat. No. 3,123,269, Wright U.S. Pat. No. 3,465,936, Hawkins U.S. Pat. No. 3,514,024 and Williams U.S. Pat. No. 3,633,807.

SUMMARY OF THE INVENTION

Storage apparatus according to the present invention is characterized by use, in a generally horizontal tape storage receptacle, of pneumatic non-mechanical means to move and manipulate the tape into, within, and during withdrawal of the tape from the receptacle, with air jets being used to inject the tape into the receptacle, other air jets being used to aid in arrangement of the tape into large serpentine folds in the main storage region of the receptacle, and still other air jets used to maintain the tape in motion preparatory to its withdrawal as well as to straighten and tension the tape during its withdrawal. By use of simple, inexpensive and reliable air jet delivery means to thus handle the tape during its storage, the problems of relative complexity, expense, and unreliability of conventional storage receptacles involving capstan-feed of the tape at the receptacle inlet are avoided.

A further object and feature of endless loop tape storage apparatus according to the present invention is the handling of the bulk of an endless magnetic tape loop in a manner so that relatively narrow (¼ inch) tape can be fed into and withdrawn from the storage receptacle at high lineal speeds (e.g. 240 inches per second), with the sole mechanical drive on the tape being from the capstan drive of an associated conventional tape deck, for efficient and economical high speed sensing or reproduction of information on the tape.

These and other objects, features and advantages of the invention will be apparent from a more detailed consideration of a typical embodiment of the invention, as shown in the accompanying drawings and described below.

BRIEF DESCRIPTION OF THE DRAWINGS

FIG. 1 is a top, isometric view of a tape storage apparatus embodying the invention, as utilized in conjunction with a conventional dual capstan recording/reproducing tape deck;

FIG. 2 is a top plan view of the storage apparatus and tape deck shown in FIG. 1;

FIG. 3 is an enlarged fragmentary, isometric view of the forward portion of the storage apparatus and an associated tape deck as shown in FIGS. 1 and 2, showing further detail thereof in the area of the entrance slot and associated air jet delivery mechanisms;

FIG. 4 is a further enlarged, fragmentary view in horizontal, cross-section of the entrance slot and associated air jet delivery mechanism in the forward end of the tape receptacle shown in FIGS. 1-3;

FIG. 5 is an enlarged, fragmentary, isometric view with certain parts broken away for clarity of illustration, of the exit slot and associated rear portion of the tape receptacle of the storage apparatus shown in FIGS. 1-4;

FIG. 6 is an enlarged, detail view in vertical cross section, taken through the top and bottom plates of the tape loop receptacle, further showing the relation thereof to the tape on edge as stored in the receptacle; and FIG. 7 is a diagrammatic view of the various air jet delivery means and air flow control mechanism utilized in the tape storage apparatus shown in FIGS. 1-5.

DESCRIPTION OF THE PREFERRED EMBODIMENT

As shown in FIG. 1, a typical storage apparatus SA embodying the invention, is utilizable in conjunction with a conventional capstan drive tape deck TD, such as a dual capstan recording/reproducing Audio-Tek tape deck Model 1100. The loop storage receptacle R of the storage apparatus SA is what may be termed a generally horizontal, shallow box or bin comprising a top plate 10, a bottom plate 12, a front wall 14, and a rear wall 16. Centrally placed in front wall 14 is an entrance slot 18 through which the tape T enters the receptacle R. Rear wall 16 correspondingly comprises a centrally placed exit slot 20 through which the tape T is withdrawn from the receptacle R.

As will be evident from the following discussion of the manner of storage and manipulation of the tape in the receptacle R, the tape T is manipulated during entry, storage and withdrawal from the receptacle R solely by air jets, all in a manner which enables its injection and withdrawal from the receptacle at high lineal speed. To this end, a dual air pump 22, conventional per se and having a high pressure section 24 and a low pressure section 26 (note FIG. 7), supplies air to various tape manipulating air jet delivery means in the receptacle R. More specifically, jet delivery means 28, 30 are disposed in closely spaced relation to the tape T at opposite sides of the entrance slot 18 with the respective jet delivery orifices 32, 34 thereof arranged to direct air jets slightly toward the tape T led therebetween and generally in a direction away from the front wall 14. Said jet delivery means 28, 30 are supplied relatively high pressure air from high pressure section 24 of air pump 22 through respective manual flow control valves 36, 38 (FIG. 7) and respective conduits 40, 42. The dimensioning of the air jet delivery components, and particularly the respective orifices 32, 34 of the air jet delivery means 28, 30 is such that the air jets 32', 34' have a relatively high velocity and relatively low volume and effectively move the tape T through the entrance slot 18 with a substantial degree of tension being applied to tape T from the point of drive thereof under action of the capstan drive wheel 44 of the tape deck TD, through the slot 18 and well into the loop storage receptacle R, at high speed and without any mechanical contact at the entrance slot 18 or within the storage receptacle R. In effect, the two air jets 32', 34' simply blow the tape into the receptacle by impinging on opposite sides of the tape, and in doing so impart to the tape a slight writhing movement laterally of its direction of movement.

Tape loop receptacle R is typically defined laterally by rearwardly diverging side wall portions 50, 52 and rearwardly converging side wall portions 54, 56. The desired manner of operation of a storage apparatus of the type to which the invention is addressed is with all but a very small portion of the length of the long endless tape (which is about 1200 feet or 1800 feet or even longer in length in a typical instance) looped in serpentine loops within the storage receptacle. It is also desired that the tape be driven through a recording or reproduction pass at high speed, such as at 240 inches per second or more. With the tape entering and being withdrawn from the storage receptacle at such a speed, and with all but a small portion of the tape to be contained in the receptacle at any given moment, it is evident that the serpentine loops of the tape in the principal storage region of the receptacle must be maintained in a dynamic condition where no bunching, binding or blockage of the many folds of tape can occur. To this end, and in accordance with the present invention, the embodiment thereof illustrated in the accompanying drawings incorporates supplemental air jet delivery means causing rearward air in the receptacle R in the general region of the front wall entrance slot, and causing forward air flow in the general region of the rear wall exit slot. More specifically, the incoming tape T, after having been initially drawn into the receptacle R by the respective high velocity air jets 32', 34', are subjected to relatively low velocity, high volume air jets emerging at the sides of the tape from respective jet delivery means 60, 62 in the form of apertured boxes (note FIGS. 1 and 3, for example), situated adjacent the front wall 14 and placed approximately equidistant between the entrance slot 18 and the respective side walls 50, 52, each of which comprises a respective rearwardly opening aperture 64, 66 delivering respective relatively low velocity, high volume air jets 64', 66' generally rearwardly of the receptacle R and along the sides of the tape T as it undergoes the transition between its relatively straight course through the entrance slot 18 and forms into the progressively wider serpentine folds in the main, generally central storage region 68 of the receptacle R. It has been found that the relatively low velocity high volume air jets 64', 66' has the effect of making the already writhing tape wirthe with greater amplitude so that it forms into long serpentine loops or folds standing on edge, without bunching, binding or entanglement of the tape, and also serve to keep the tape after folding thereof well away from the forward portion of the receptacle so as to not impede similar manipulation of the tape subsequently entering the receptacle.

As in part shown in FIG. 7, the respective jet delivery apertures 64, 66 are supplied air from the low pressure section 26 of air pump 22 through respective manual flow control valves 70, 72 and respective conduits 74, 76.

To obviate possible binding and bunching of the folded tape in the region of the receptacle R immediately upstream of the tape exit slot 20, the present invention, either alternatively or conjunctively with the high velocity and low velocity tape manipulating air jets discussed above, utilizes opposed relatively low velocity high volume air jets acting on the tape immediately prior to and as it enters the exit slot 20 to maintain the tape moving in a substantially straight course immediately upstream of the exit slot, and to maintain the relatively downstream folds and unfolding folds of tape well clear of what may be termed the discharge throat area, generally designated at 78. To this end, opposed, relatively low velocity, high volume air jets are directed against the tape T as it passes to the exit slot and also directed forwardly toward the tape convolutes from respective air jet delivery means generally indicated at 80, 82, suitably in the form of boxes with inwardly directed respective apertures or openings 84, 86 placed in spaced, approximately equidistant relation to the tape and the exit slot 20 and slightly forwardly of the slot. A suitable spacing of the apertures 84, 86 from the tape is two inches, in a typical installation. Each such aperture 84, 86 is arranged to direct its air jet or stream 84', 86' into the receptacle R and throat region 78 thereof. The portion of the jet streams 84', 86' directed generally perpendicular to the direction of movement of the exiting tape T function to straighten the course thereof and the portions of such jet streams flowing forwardly into the region 78 function to keep the collapsing tape folds somewhat away from the converging side wall portions 54, 56 and to dynamically tension the tape T during its withdrawal through the exit slot 20. The air jets 84', 86' striking the tape may be said to move in convection patterns along it into the receptacle throat region 78. This action retards the motion of the tape in being withdrawn and thus serves to straighten and tension the segment thereof between the throat region and the exit slot. The air flow into the receptacle R from the rear wall jets 84', 86' also serves to cause the segment of tape being withdrawn to writhe laterally. Being already in motion, this segment is not abruptly accelerated from rest upon withdrawal and tape snap is thus avoided.

As in part shown in FIG. 7, relatively high volume, low pressure jet delivery means 84, 86 are supplied air from low pressure section 26 of air pump 22 through respective manual control valve means 88, 90 and respective conduits 92, 94.

To further augment the desired concentration of the bulk of the stored tape in the generally central region 68 of the receptacle R, forwardly of the throat region 78 thereof, either one or both of the top and bottom plates 12, 14 are provided with a plurality of air exhaust apertures generally in the region 68 and somewhat downstream thereof, through which air can exhaust freely. Certain of such apertures in the top plate 10 are indicated at 96 and certain of the apertures in the bottom plate 12 are indicated at 98.

The tape T emerging from exit slot 20 of the receptacle R is led past a series of idler rollers 100, 102, 104 and returned to the tape deck TD. In the embodiment shown, this return path includes idler roller 100 adjacent the exit slot 20, idler roller 102 at one rear corner of the storage apparatus SA, and idler roller 104 at the contiguous front corner of the storage apparatus. As will be apparent from FIGS. 1-3 and 5, movement of the tape T out of the receptacle R and past rollers 100, 102, 104 is caused by withdrawal of the tape by the capstan drive means of the tape deck TD, including capstan drive wheels 44 and 106, and the capstan drive means of the tape deck are the sole tape moving means externally of the tape storage receptacle R and the sole mechanical drive for the tape loop in the system. As will be apparent, and although the tape transport deck shown in conjunction with the storage apparatus of the invention is a conventional so-called dual capstan type transport deck, the storage apparatus of the invention can also be used with other types of tape transport devices, such as transport decks with a single capstan drive and vacuum block means to maintain back tension on the tape portion coursing the recorder/reproducer heads. Sidewall portions 50, 52 are preferably relatively movable on the bottom plate 12, and each comprises respective top and bottom seals 108 and 112, 114 to prevent air flow exiting around the sidewall portions in the areas of engagement thereof with the top plate 10 and bottom plate 12.

Top plate 10, as best shown in FIGS. 1 and 2, is fabricated from clear plastic or the like and hinged along one edge as at side hinge 116 to facilitate access to the receptacle R for the purpose of initial threading of the tape T therethrough, for change in position of the side rail portions 50, 52, or for cleaning and the like.

In a typical installation embodying the present invention, the area of each of high velocity air jet orifices 32, 34 is 0.002 square inch, the velocity of emerging air jets 32', 34' is about 30 feet per second, the area of each of low velocity air jet apertures 64, 66 is 0.5 square inch (¼ inch × 2 inches), the velocity of the emerging air jets 64', 66' is about 5 feet per second, the area of each of apertures 84, 86 is 0.375 square inch (¼ inch × 1½ inches), and the velocity of the emerging air jets 84', 86' directed therefrom is about 3 feet per second, with tape T being 1 mil Mylar magnetic tape ¼ inch wide, formed in an endless loop 1800 feet in length, driven at 240 inches per second. In this installation, the motor driven air pump 22 has a high pressure section 24 operating at 30 psig and a capacity of 0.5 cfm and a low pressure section 26 operating at a pressure of 2 psig and a capacity of 10 cfm. In this installation, the top frame of the storage apparatus is 48 inches in length and 24 inches in width.

Although the specific embodiment of the invention above discussed illustrates application of the invention to magnetic tape, and particularly ¼ inch wide magnetic tape, it will be readily understood that other types of information tape, such as punched paper, or other widths of tape, or other lengths of tape making up the endless loop can be handled by storage apparatus constructed and operated in accordance with the present invention. These and other modifications, applications and adaptations of the invention will readily occur to those skilled in the art to which the invention is addressed, within the scope of the following claims.

What is claimed is:

1. In an endless tape loop storage apparatus of the type having a generally horizontally disposed storage receptacle for tape being driven by and returned to a tape drive mechanism, such as for storing a loop of magnetic tape or the like when driven at high speed by the capstan drive means of a conventional audio tape recorder transport deck or the like, and wherein such storage receptacle is defined by a generally horizontal top plate, a generally horizontal bottom plate, a front wall defining an entrance slot through which the tape passes from the drive mechanism into the receptacle, a rear wall defining an exit slot through which the tape emerges from the receptacle for return thereof to the drive mechanism, and two side walls, with air jet delivery means being associated with said entrance and exit slots and directed to assist the flow of the tape into and out of the receptacle, the improvement comprising:

(a) two relatively high velocity, low volume air jet delivery means closely spaced at opposite sides of said entrance slot and directed into the receptacle in a direction generally away from the front wall and delivering air at a velocity substantially exceeding the velocity of the tape and thereby moving the tape through said entrance slot and into the receptacle at high speed without mechanical contact therewith;

(b) two relatively low velocity, high volume air jet delivery means situated adjacent said front wall and placed approximately equidistant between the entrance slot and the respective side walls, and directing air streams into the receptacle in a direction generally away from the front wall and thereby causing the tape entering the receptacle to become arranged in long serpentine folds on edge in the generally central region of the receptacle; and (c) a plurality of air exhaust apertures in at least one of said top plate and said bottom plate in the region(s) thereof overlying and underlying the serpentine folds of the tape in the receptacle, and through which air can exhaust freely, thus influencing the direction and velocity of air flow inside the receptacle to maintain the bulk of the stored tape concentrated in said generally central region.

2. An endless tape loop storage apparatus according to claim 1, wherein said high velocity, low volume jet delivery means delivers air at a velocity of about thirty feet per second.

3. An endless tape loop storage apparatus according to claim 2, wherein the cross-sectional area of the jet orifice of each said high velocity, low volume jet delivery means is about 0.002 square inch.

4. In a tape storage apparatus as claimed in claim 1, a tape storage receptacle further comprising:

(d) two relatively high volume, low velocity jet delivery means placed approximately equidistant from and in spaced relation to the exit slot of the apparatus, and each arranged to direct its air stream into the receptacle in a direction generally toward the portion of the tape being withdrawn through the exit slot for the purpose of causing that portion of the tape to writhe back and forth in directions generally perpendicular to its direction of movement out of the exit slot, and for the purpose of tensioning the tape during its withdrawal through the exit slot.

5. In a tape storage apparatus according to claim 4, wherein the storage apparatus further comprises idler rollers placed adjacent the exit slot and at one rear corner and at the contiguous front corner externally of the receptacle, with the endless loop of tape being led past said rollers and to the capstan drive means of drive mechanism situated at the front end of the storage apparatus, the capstan drive means of the tape transport deck being the sole tape moving element externally of the tape storage receptacle and maintaining tension on that portion of the tape loop between the idler roller at the exit slot and the drive capstan of the tape drive mechanism.

6. In a tape storage apparatus according to claim 4, a tape storage receptacle wherein portions of the air jets directed into the receptacle by the jet means disposed at opposite sides of the tape being withdrawn from the exit slot flow in a direction generally opposite to the direction or movement of the tape being withdrawn from the exit slot, to avoid bunching of the serpentine folds of the tape in the receptacle area immediately inside the exit slot and to aid in maintaining the folds of tape on edge and closely packed in the central portion of the receptacle.

7. In combination with a tape storage apparatus according to claim 1, capstan drive means for withdrawing tape from the receptacle and through the transport deck at a speed of at least about 240 inches per second, and an information tape which is magnetic tape one-quarter inch in width and at least about 1200 feet in length.

8. A tape storage apparatus according to claim 4, wherein said low velocity air jet delivery means adjacent the exit slot comprise jet delivery orifices, each delivering an air jet at a velocity of about 3 feet per second.

9. An endless tape loop storage apparatus according to claim 8, wherein the cross-sectional area of the jet orifice of each said low velocity, air jet delivery means is about 0.375 square inch.

10. In an endless tape loop storage apparatus of the type having a generally horizontally disposed storage receptacle for tape being driven by and returned to a tape drive mechanism, such as for storing a loop of magnetic tape or the like when driven at high speed by the capstan drive means of a conventional audio tape recorder transport deck or the like, and wherein such storage receptacle is defined by a generally horizontal top plate, a generally horizontal bottom plate, a front wall defining an entrance slot through which the tape passes from the drive mechanism into the receptacle, a rear wall defining an exit slot through which the tape emerges from the receptacle for return thereof to the drive mechanism, and two side walls, with air jet delivery means being associated with said entrance and exit slots and directed to assist the flow of the tape into and out of the receptacle, the improvement comprising:

(a) two relatively high velocity, low volume air jet delivery means closely spaced at opposite sides of said entrance slot and directed into the receptacle in a direction generally away from the front wall and effective to move the tape through said entrance slot and into the receptacle at high speed without mechanical contact therewith;

(b) two relatively low velocity, high volume air jet delivery means situated adjacent said front wall and placed approximately equidistant between the entrance slot and the respective side walls, and directing air streams into the receptacle in a direction generally away from the front wall for the purpose of causing the tape entering the receptacle to become arranged in long serpentine folds on edge in the receptacle; and (c) a plurality of air exhaust apertures in at least one of said top plate and said bottom plate in the region(s) thereof adjacent the serpentine folds of the tape in the receptacle, and through which air can exhaust freely, thus influencing the direction and pressure of air flow inside the receptacle;

said high velocity air jet delivery means comprising jet delivery orifices adjacent the entrance slot, each with a cross-sectional area of about 0.002 square inch, delivering an air jet at a velocity of about 30 feet per second, and said low velocity air jet delivery means adjacent the entrance slot and situated laterally outwardly of said high velocity air jet delivering means, said low velocity air jet delivery means including two jet delivery orifices, each with a cross-sectional area of about 0.5 square inch, delivering an air jet at a velocity of about 5 feet per second.

11. A tape storage apparatus according to claim 10, wherein said low velocity air jet delivery means adjacent the exit slot comprise laterally opposed jet delivery orifices, each directed toward the tape leading to the exit slot and each having a cross-sectional area of about 0.375 square inch delivering an air jet at a velocity of about three feet per second.

12. In an endless tape loop storage apparatus of the type having a generally horizontally disposed storage receptacle for tape being driven by and returned to a tape drive mechanism, such as for storing a loop of magnetic tape or the like when driven at high speed by the capstan drive means of a conventional audio tape recorder transport deck or the like, and wherein such storage receptacle is defined by a generally horizontal top plate, a generally horizontal bottom plate, a front wall defining an entrance slot through which the tape passes from the drive mechanism into the receptacle, a rear wall defining an exit slot through which the tape emerges from the receptacle for return thereof to the drive mechanism, and two side walls, with air jet delivery means directed to assist the flow of the tape into and out of the receptacle, the improvement comprising:

(a) two relatively high volume, low velocity jet delivery means placed approximately equidistant from and in spaced relation to the exit slot of the apparatus, and each arranged to direct an air stream into the receptacle in a direction generally toward the portion of the tape being withdrawn through the exit slot for the purpose of causing that portion of the tape to writhe back and forth in directions laterally of its direction of movement out of the exit slot, and for the purpose of straightening and tensioning the tape during its withdrawal through the exit slot; and (b) a plurality of air exhaust apertures in at least one of said top plate and said bottom plate laterally across the generally central region(s) thereof, and through which air can exhaust freely, thus laterally distributing the flow of air into the receptacle counter to the flow of tape therefrom;

said low velocity air jet delivery means adjacent the exit slot comprising jet delivery orifices, each with a cross-sectional area of about 0.375 square inch, delivering an air jet at a velocity of about three feet per second.

13. In an endless tape loop storage apparatus of the type having a generally horizontally disposed storage receptacle for tape being driven by and returned to a tape drive mechanism, such as for storing a loop of magnetic tape or the like when driven at high speed by the capstan drive means of a conventional audio tape recorder transport deck or the like, and wherein such storage receptacle is defined by a generally horizontal top plate, a generally horizontal bottom plate, a front wall defining an entrance slot through which the tape passes from the drive mechanism into the receptacle, a rear wall defining an exit slot through which the tape emerges from the receptacle for return thereof to the drive mechanism, and two side walls, with air jet delivery means being associated with said entrance and exit slots and directed to assist the flow of the tape into and out of the receptacle, the improvement comprising:

(a) two relatively high velocity, low volume air jet delivery means closely spaced at opposite sides of said entrance slot and directed into the receptacle in a direction generally away from the front wall and effective to move the tape through said entrance slot and into the receptacle at high speed without mechanical contact therewith;

(b) two relatively low velocity, high volume air jet delivery means situated adjacent said front wall and placed approximately equidistant between the entrance slot and the respective side walls, and directing air streams into the receptacle in a direction generally away from the front wall for the purpose of causing the tape entering the receptacle to become arranged in long serpentine folds on edge in the receptacle;

(c) a plurality of air exhaust apertures in at least one of said top plate and said bottom plate in the region(s) thereof adjacent the serpentine folds of the tape in the receptacle, and through which air can exhaust freely, thus influencing the direction and pressure of air flow inside the receptacle; and (d) said side walls comprising laterally movable wall portions extending from said front wall to locations about two-thirds the distance from the front wall to said rear wall in diverging relation toward the rear wall, and further side wall portions converging toward the rear wall and extending generally toward said exit slot.

14. In an endless tape loop storage apparatus of the type having a generally horizontally disposed storage receptacle for tape being driven by and returned to a tape drive mechanism, such as for storing a loop of magnetic tape or the like when driven at high speed by the capstan drive means of a conventional audio tape recorder transport deck or the like, and wherein such storage receptacle is defined by a generally horizontal top plate, a generally horizontal bottom plate, a front wall defining an entrance slot through which the tape passes from the drive mechanism into the receptacle, a rear wall defining an exit slot through which the tape emerges from the receptacle for return thereof to the drive mechanism, and two side walls, with air jet delivery means being associated with said entrance and exit slots and directed to assist the flow of the tape into and out of the receptacle, the improvement comprising:

(a) two relatively high velocity, low volume air jet delivery means closely spaced at opposite sides of said entrance slot and directed into the receptacle in a direction generally away from the front wall and effective to move the tape through said entrance slot and into the receptacle at high speed without mechanical contact therewith;

(b) two relatively low velocity, high volume air jet delivery means situated adjacent said front wall and placed approximately equidistant between the entrance slot and the respective side walls, and directing air streams into the receptacle in a direction generally away from the front wall for the purpose of causing the tape entering the receptacle to become arranged in long serpentine folds on edge in the receptacle;

(c) a plurality of air exhaust apertures in at least one of said top plate and said bottom plate in the region(s) thereof adjacent the serpentine folds of the tape in the receptacle, and through which air can exhaust freely, thus influencing the direction and pressure of air flow inside the receptacle; and (d) hinge means along one side of said top plate, enabling upward opening thereof, and air retaining seals along said side walls to prevent air from exiting around said side walls when the top plate is in closed position.

15. In an endless tape loop storage apparatus of the type having a generally horizontally disposed storage receptacle for tape being driven by and returned to a tape drive mechanism, such as for storing a loop of magnetic tape or the like when driven at high speed by the capstan drive means of a conventional audio tape recorder transport deck or the like, and wherein such storage receptacle is defined by a generally horizontal top plate, a generally horizontal bottom plate, a front wall defining an entrance slot through which the tape passes from the drive mechanism into the receptacle, a rear wall defining an exit slot through which the tape emerges from the receptacle for return thereof to the drive mechanism, and two side walls, with air jet delivery means being associated with said entrance and exit slots and directed to assist the flow of the tape into and out of the receptacle, the improvement comprising:
- (a) two relatively high velocity, low volume air jet delivery means closely spaced at opposite sides of said entrance slot and directed into the receptacle in a direction generally away from the front wall and effective to move the tape through said entrance slot and into the receptacle at high speed without mechanical contact therewith;
- (b) two relatively low velocity, high volume air jet delivery means situated adjacent said front wall and placed approximately equidistant between the entrance slot and respective side walls, and directing air streams into the receptacle in a direction generally away from the front wall for the purpose of causing the tape entering the receptacle to become arranged in long serpentine folds on edge in the receptacle; and
- (c) a tape storage receptacle wherein the side walls laterally defining said receptacle comprise laterally movable wall portions extending from the front wall to locations about two-thirds the distance from the front wall to the rear wall in diverging relation toward the rear wall, and further side wall portions converging toward the rear wall and extending generally toward said exit slot.

* * * * *